United States Patent
Hon et al.

(10) Patent No.: US 10,978,934 B2
(45) Date of Patent: Apr. 13, 2021

(54) ENGINE WITH A PERMANENT MAGNET ELECTRIC MACHINE

(71) Applicant: General Electric Company, Schenectady, NY (US)

(72) Inventors: Robert Charles Hon, Walton, KY (US); Di Pan, Schenectady, NY (US); Pablo Gabriel Piazza Galarza, Cincinnati, OH (US); Paul Robert Gemin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 133 days.

(21) Appl. No.: 16/113,401

(22) Filed: Aug. 27, 2018

(65) Prior Publication Data

US 2020/0067383 A1 Feb. 27, 2020

(51) Int. Cl.
| | |
|---|---|
| *H02K 7/18* | (2006.01) |
| *H02P 9/12* | (2006.01) |
| *F01D 15/10* | (2006.01) |
| *H02K 1/17* | (2006.01) |
| *H02K 1/27* | (2006.01) |
| *H02K 15/03* | (2006.01) |
| *H02K 21/14* | (2006.01) |

(52) U.S. Cl.
CPC .......... *H02K 7/1823* (2013.01); *F01D 15/10* (2013.01); *H02P 9/12* (2013.01); *F05D 2220/768* (2013.01); *H02K 1/17* (2013.01); *H02K 1/2766* (2013.01); *H02K 15/03* (2013.01); *H02K 21/14* (2013.01)

(58) Field of Classification Search
CPC .. H02J 1/102; H02J 3/383; H02J 7/35; H02H 7/06; F02C 6/04
See application file for complete search history.

(56) References Cited

U.S. PATENT DOCUMENTS

| | | | | |
|---|---|---|---|---|
| 2,767,339 A | * | 10/1956 | Hatfield | H02K 19/08 310/162 |
| 5,889,338 A | | 3/1999 | Richmond et al. | |
| 6,441,521 B1 | | 8/2002 | Dombrovski et al. | |
| 6,895,741 B2 | * | 5/2005 | Rago | F02C 7/32 60/226.1 |

(Continued)

FOREIGN PATENT DOCUMENTS

| | | |
|---|---|---|
| DE | 102016207392 A1 | 11/2017 |
| EP | 2058941 A | 5/2009 |

(Continued)

OTHER PUBLICATIONS

European Search Report Corresponding to Application No. 19192497 dated Dec. 13, 2019.

(Continued)

*Primary Examiner* — Bickey Dhakal (74) *Attorney, Agent, or Firm* — Dority & Manning, P.A.

(57) ABSTRACT

A method for operating a permanent magnet electric machine of an engine includes determining a fault condition of the permanent magnet electric machine; and reducing a magnetism of one or more permanent magnets of the permanent magnet electric machine by increasing a temperature of the one or more permanent magnets in response to determining the fault condition of the permanent magnet electric machine.

20 Claims, 6 Drawing Sheets

(56) References Cited

U.S. PATENT DOCUMENTS

| | | |
|---|---|---|
| 7,330,016 B2 | 2/2008 | Colley |
| 8,013,565 B2 | 9/2011 | Miura |
| 8,941,970 B2 | 1/2015 | Metala et al. |
| 2008/0095652 A1* | 4/2008 | Jiang ................ F01C 1/322 418/48 |
| 2011/0074231 A1 | 3/2011 | Soderberg |
| 2011/0234180 A1* | 9/2011 | Cullen ............ H02P 29/0241 322/89 |
| 2011/0251746 A1* | 10/2011 | Wu ...................... B60K 6/48 701/22 |
| 2014/0126607 A1* | 5/2014 | Oya ..................... G01K 7/427 374/163 |
| 2016/0023773 A1* | 1/2016 | Himmelmann ........ B64D 27/10 60/778 |
| 2016/0178081 A1* | 6/2016 | Gramss ............... F16K 11/165 137/468 |
| 2017/0126087 A1 | 5/2017 | Soderberg |
| 2017/0305274 A1 | 10/2017 | Saha et al. |
| 2018/0278102 A1* | 9/2018 | Shirokov ............ H02K 49/106 |
| 2019/0193576 A1* | 6/2019 | Kuroe .................. B60L 15/20 |

FOREIGN PATENT DOCUMENTS

| | | |
|---|---|---|
| JP | 2004/194406 A | 7/2004 |
| JP | 2009/106025 A | 5/2009 |

OTHER PUBLICATIONS

Prieto Rocandio et al., "Design and Analysis of Fractional-Slot Concentrated-Winding Multiphase Fault-Tolerant Permanent Magnet Synchronous Machines", Dissertation, Tecnun Universidad de Navarra, Jan. 1, 2015, pp. 1-264.

\* cited by examiner

ENGINE WITH A PERMANENT MAGNET ELECTRIC MACHINE

FIELD

The present subject matter relates generally to an engine having a permanent magnet electric machine.

BACKGROUND

Typical aircraft propulsion systems include one or more gas turbine engines. For certain propulsion systems, the gas turbine engines generally include a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

For at least certain propulsion systems including the above gas turbine engines, it may be beneficial to include an electric fan to supplement propulsive power provided by the one or more gas turbine engines included with the propulsion system. However, inclusion of a sufficient amount of energy storage devices with the propulsion system to power the electric fan may be space and weight prohibitive. Accordingly, at least certain propulsion systems include one or more electric machines rotatable with one or more of the gas turbine engines to generate electrical power during operation to drive the electric fan.

Further, the inventors of the present disclosure have determined that utilizing permanent magnet electric machines may have certain benefits over other configurations of electric machines. Such benefits may include power density, efficiency and simplicity. One negative characteristic of permanent magnet electric machines, however, relates to their behavior after an internal coil fault has occurred. Specifically, after such an event, the permanent magnet electric machine may generate into the fault so long as the rotor is spinning, potentially causing significant drag on the driving engine and generating heat within the faulted coil. This unwanted generation may have negative consequences, and in the current art the only way to halt such unwanted generation is to stop rotation (i.e. turn the driving engine off). This action may cause further negative consequences, namely loss of thrust and power. Other types of electric machines do not have this same issue, as their rotor can be effectively deactivated.

Accordingly, a safety system for a permanent magnet electric machine that may be utilized with an engine, such as a gas turbine engine, to overcome the above obstacle would be useful.

BRIEF DESCRIPTION

Aspects and advantages of the invention will be set forth in part in the following description, or may be obvious from the description, or may be learned through practice of the invention.

In one an exemplary aspect of the present disclosure, a method for operating a permanent magnet electric machine of an engine is provided. The method includes determining a fault condition of the permanent magnet electric machine; and reducing a magnetism of one or more permanent magnets of the permanent magnet electric machine by increasing a temperature of the one or more permanent magnets in response to determining the fault condition of the permanent magnet electric machine.

In certain exemplary embodiments the engine is a combustion engine.

In certain exemplary embodiments the engine is at least one of a turboshaft engine, a turboprop engine, or a turbofan engine.

In certain exemplary embodiments the engine is configured to generate a maximum amount of power during operation, wherein the permanent magnet electric machine is capable of extracting a maximum amount of power from the engine, and wherein the maximum amount of power the permanent magnet electric machine is capable of extracting from the engine is between about 2.5% and about 75% of the maximum amount of power the engine is configured to generate during operation.

For example, in certain exemplary aspects the maximum amount of power the permanent magnet electric machine is capable of extracting from the engine is greater than about 25% of the maximum amount of power the engine is configured to generate during operation.

In certain exemplary embodiments determining the fault condition of the permanent magnet electric machine includes determining an internal coil fault of the permanent magnet electric machine.

In certain exemplary embodiments reducing the magnetism of the one or more permanent magnets by increasing the temperature of the one or more permanent magnets includes driving current through a stator assembly of the permanent magnet electric machine to induce eddy current losses in a rotor assembly of the permanent magnet electric machine.

For example, in certain exemplary aspects the permanent magnet electric machine defines a designed current frequency operating range, and wherein driving current through the stator assembly of the permanent magnet electric machine to induce eddy current losses includes driving current through the stator assembly of the permanent magnet electric machine at a frequency other than the designed current frequency operating range.

In certain exemplary embodiments reducing the magnetism of the one or more permanent magnets by increasing the temperature of the one or more permanent magnets includes providing a heating fluid to the permanent magnet electric machine.

For example, in certain exemplary aspects providing the heating fluid to the permanent magnet electric machine includes providing a bleed air to the permanent magnet electric machine.

In certain exemplary embodiments reducing the magnetism of the one or more permanent magnets by increasing the temperature of the one or more permanent magnets includes reducing a cooling of the permanent magnet electric machine using a thermal management system.

For example, in certain exemplary aspects reducing the cooling of the permanent magnet electric machine using the thermal management system includes bypassing a heat sink heat exchanger of the thermal management system.

In certain exemplary embodiments reducing the magnetism of the one or more permanent magnets by increasing the temperature of the one or more permanent magnets includes injecting a fluid into an air gap of the permanent magnet electric machine.

For example, in certain exemplary aspects the fluid defines a viscosity greater than a viscosity of air.

In certain exemplary embodiments reducing the magnetism of the one or more permanent magnets by increasing the temperature of the one or more permanent magnets includes adding between about five kilowatts of heat energy and about five hundred kilowatts of heat energy.

In certain exemplary embodiments the permanent magnet electric machine includes a rotor assembly having a plurality of laminations and a shaft, wherein the plurality of laminations are fitted onto the shaft, and wherein reducing the magnetism of the one or more permanent magnets by increasing the temperature of the one or more permanent magnets includes decreasing a contact pressure between the plurality of laminations and the shaft.

For example, in certain exemplary aspects the engine includes a thermal management system for providing a cooling fluid through one or more openings in the shaft.

In an exemplary embodiment of the present disclosure, an engine is provided defining an axis. The engine includes a stationary component; a rotary component rotatable about the axis of the engine relative to the stationary component; a permanent magnet electric machine including a stator assembly coupled to the stationary component and a rotor assembly coupled to the rotary component, the rotor assembly including one or more permanent magnets; and a controller operable with the permanent magnet electric machine, the controller configured to determine a fault condition of the permanent magnet electric machine and increase a temperature of the one or more permanent magnets of the permanent magnet electric machine in response to determining the fault condition.

In certain exemplary embodiments, the engine further includes an electric transfer bus in electrical communication with the permanent magnet electric machine, wherein the controller is further operably connected to the electric transfer bus.

For example, in certain exemplary embodiments the engine is configured to generate a maximum amount of power during operation, wherein the permanent magnet electric machine is capable of extracting a maximum amount of power from the engine, and wherein the maximum amount of power the permanent magnet electric machine is capable of extracting from the engine is between about 2.5% and about 75% of the maximum amount of power the engine is configured to generate during operation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a component or system, and refer to the normal operational attitude of the component or system. For example, with regard to a robotic arm, forward refers to a position closer to a distal end of the robotic arm and aft refers to a position closer to a root end of the robotic arm.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
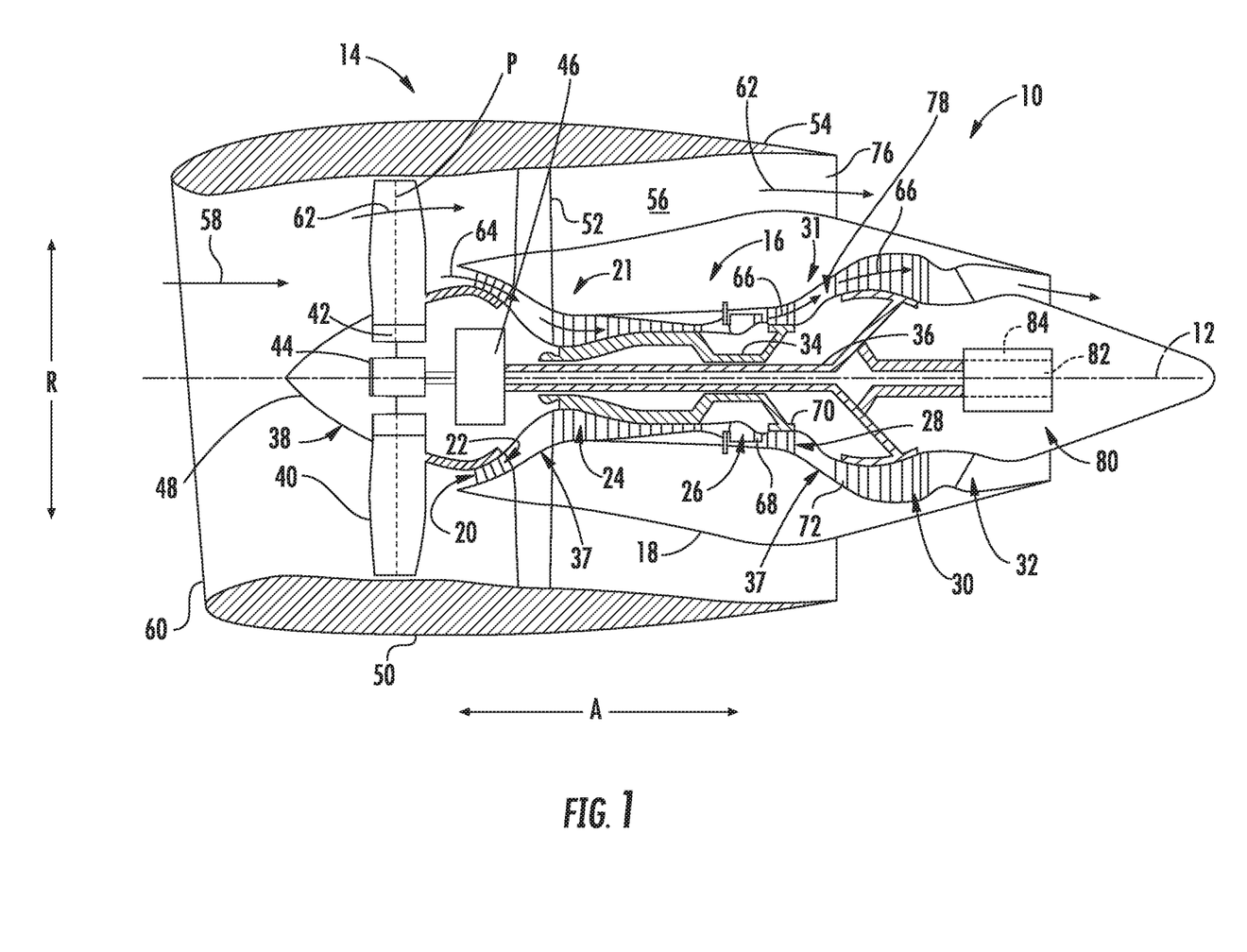
FIG. 1 is a schematic, cross-sectional view of a gas turbine engine in accordance with an exemplary embodiment of the present disclosure.

Referring now to the drawings, wherein identical numerals indicate the same elements throughout the figures, FIG. 1 is a schematic cross-sectional view of an engine in accordance with an exemplary embodiment of the present disclosure. More particularly, for the embodiment of FIG. 1, the engine is a gas turbine engine, and more specifically, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, and turbine section together define a core air flowpath 37 extending from the annular inlet 20 through the LP compressor 22, HP compressor 24, combustion section 26, HP turbine section 28, LP turbine section 30 and jet nozzle exhaust section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. It should be appreciated that for the embodiment depicted, the nacelle 50 is supported relative to the turbomachine 16 by a plurality of circumferentially-spaced outlet guide vanes 52. Moreover, a downstream section 54 of the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine rotor blades 72 that are coupled to the LP shaft or spool 36, thus causing the LP shaft or spool 36 to rotate. Such thereby supports operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, providing most of the propulsive thrust for the turbofan engine 10. The HP turbine 28, the LP turbine 30, and the jet exhaust nozzle section 32 at least partially define a hot gas path 78 for routing the combustion gases 66 through the turbomachine 16.

Additionally, the exemplary turbofan 10 depicted includes a permanent magnet electric machine 80 rotatable with the turbofan 10. Specifically, for the embodiment depicted, the permanent magnet electric machine 80 is co-axially mounted to, and rotatable with, the LP shaft 36 (the LP shaft 36 also rotating the fan 38 through, for the embodiment depicted, the power gearbox 46). As used herein, "co-axially" refers to the axes being aligned. It should be appreciated, however, that in other embodiments, an axis of the permanent magnet electric machine 80 may be offset radially from the axis of the LP shaft 36 and further may be oblique to the axis of the LP shaft 36, such that the permanent magnet electric machine 80 may be positioned at any suitable location at least partially inward of the core air flowpath 37.

The permanent magnet electric machine 80 includes a rotor assembly 82 and a stator assembly 84. As will be discussed below, the rotor assembly 82 may generally include a plurality of permanent magnets 88, such that it may be referred to as a permanent magnet rotor assembly 82. Additionally, the stator assembly 84 may generally include a plurality of coils 86 operable with the plurality of permanent magnets 88 of the rotor assembly 82. When electrical power is provided to the plurality of coils 86 of the stator assembly 84, the permanent magnet electric machine 80 may operate to add torque to the turbofan 10 through the LP shaft 36. By contrast, in other exemplary aspects, the plurality of coils 86 of the stator assembly 84 may operate to extract electrical power, converting torque of the turbofan 10, and more specifically, of the LP shaft 36, into electrical power.

It will further be appreciated that, in certain exemplary embodiments, the turbofan engine 10 may be integrated into a propulsion system. With such an exemplary embodiment, the permanent magnet electric machine 80 may be electrically connected, or connectable, to one or more electric propulsion devices of the propulsion system (such as one or more electric fans), one or more power storage devices, etc.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbine fan engine 10 may include any other suitable number or configuration of shafts or spools, compressors, turbines, etc., and/or may exclude, e.g., the power gearbox 46 and/or the pitch change mechanism 44, etc. Accordingly, it will be appreciated that in other exemplary embodiments, the turbofan engine 10 may instead be configured as a direct drive turbofan engine, a fixed pitch turbofan engine, etc. Further, in still other exemplary embodiments, the turbofan engine 10 may be configured as any other suitable gas turbine engine, such as a turbojet engine, a turboshaft engine, a turboprop engine, etc. Further, still, in other embodiments, the turbofan engine may be configured as any other suitable engine, such as an electric propulsion fan for an aircraft propulsion system or any form of combustion engine (e.g., an internal combustion engine). With such a configuration, the engine may not include any of the turbomachinery, and instead may generally include the fan 38 and the permanent magnet electric machine 80.

Figure 2:
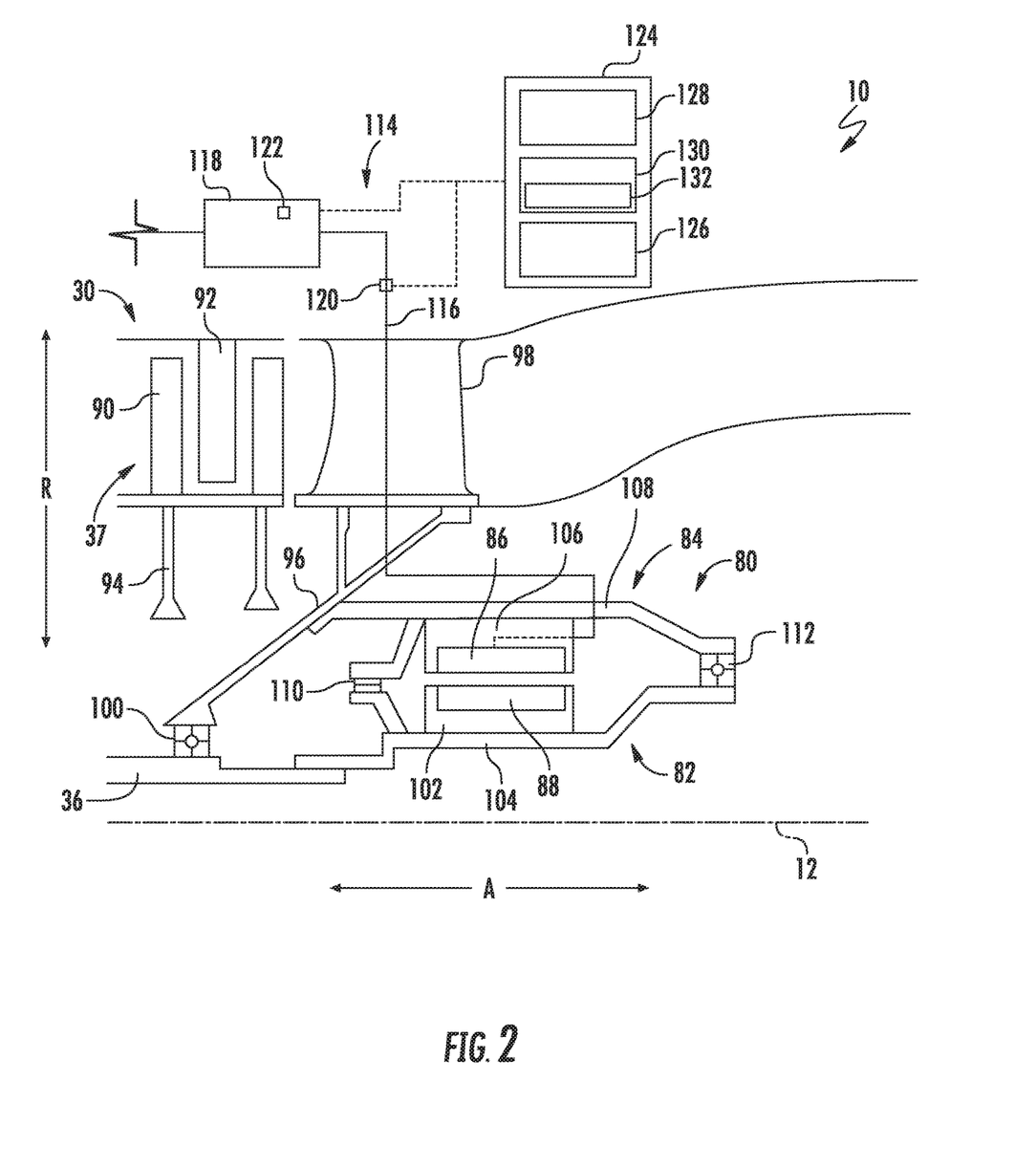
FIG. 2 is a schematic, close-up view of a gas turbine engine and permanent magnet electric machine in accordance with an exemplary embodiment of the present disclosure.

Referring now to FIG. 2, a close-up, schematic view of the exemplary permanent magnet electric machine 80 of FIG. 1, embedded within the engine of FIG. 1, is provided. More particularly, for the embodiment depicted and as noted above, the permanent magnet electric machine 80 is embedded within the turbine section of the turbofan engine 10, at a location inward of a core air flowpath 37 and positioned at least partially within or aft of the turbine section along an axial direction A. Of course, as discussed above, in other exemplary embodiments, the permanent magnet electric machine 80 may instead be positioned at any other suitable location within the turbofan engine 10, such as within the compressor section, forward of the compressor section, radially outward of the core air flowpath 37 (e.g., under the cowling of the turbomachine 16, such as part of an accessory gearbox), etc.

More specifically, for the exemplary embodiment depicted, the permanent magnet electric machine 80 is positioned inward of the core air flowpath 37, and at least partially aft of the LP turbine 30 of the turbine section of the turbofan engine 10. Briefly, as will be appreciated, the exemplary LP turbine 30 depicted generally includes a plurality of LP turbine rotor blades 90 and a plurality of LP turbine stator vanes 92 (although only one is shown). Further, it will be appreciated that the plurality of LP turbine rotor blades 90 are each generally coupled to a respective rotor 94, with the plurality of respective rotors 94 coupled to, or otherwise rotatable with, the LP shaft 36.

Moreover, for the embodiment of FIG. 2, the turbofan engine 10 generally includes a rotary component and a stationary component. The rotary component is rotatable with a compressor within the compressor section (not shown) of the turbofan engine 10 and/or a turbine within the turbine section of the turbofan engine 10. By contrast, the stationary component may be any suitable component which is configured to remain stationary relative to the various rotating components of the compressors and turbines.

For the exemplary embodiment depicted, the stationary component is part of a structural support member 96 of the turbofan engine 10, the structural support member 96 being configured as part of an aft frame assembly and extending from an aft frame strut 98 of the aft frame assembly. The aft strut 98 extends through the core air flowpath 37 of the turbofan engine 10, and is configured to provide structural support for the turbofan engine 10. The structural support member 96 also extends forward to support an aft engine bearing 100—the aft engine bearing 100 rotatably supporting an aft end of the LP shaft 36.

Further, as also noted above, the permanent magnet electric machine 80 generally includes the rotor assembly 82 and the stator assembly 84. The rotor assembly 82 is coupled to the rotary component of the gas turbine engine and the stator assembly 84 is coupled to the stationary component of the turbofan engine 10. More particularly, for the embodiment depicted the rotary component to which the rotor assembly 82 is coupled is the LP shaft 36 of the turbofan engine 10, such that the rotor assembly 82 is rotatable with the LP shaft 36. By contrast, the stationary component to which the stator assembly 84 is coupled is the structural support member 96 of the turbine section.

More specifically, the rotor assembly 82 generally includes a rotor 102 and a shaft 104. The rotor 102 may be formed of a plurality of sequentially arranged laminations 142 (see callout Circle A of FIG. 3, below) arranged, e.g. axially, on the shaft 104, with these plurality of sequentially arranged laminations 142 mounting a plurality of permanent magnets 88 of the rotor assembly 82. The plurality of permanent magnets 88 may be arranged circumferentially about an axis of the permanent magnet electric machine 80 (which for the embodiment depicted is aligned with axis 12 of the turbofan engine 10). Similarly, the stator assembly 84 generally includes a stator 106 and a shaft 108. The stator 106 includes the plurality of coils 86, which may also be arranged circumferentially about the axis of the permanent magnet electric machine 80. The rotor assembly 82 is rotatable relative to the stator assembly 84 during operation, and is rotatably supported relative to the stator assembly 84 by, for the embodiment depicted, a forward roller bearing 110 and an aft ball bearing 112. However, in other embodiments, any other suitable configuration may be provided for rotatably supporting the rotor assembly 82 relative to the stator assembly 84 (e.g., any other suitable configuration of mechanical bearings, use of suitable air bearings, etc.).

Further, the permanent magnet electric machine 80 is electrically connected to an electric transfer bus 114. The electric transfer bus 114 includes an electric line 116 extending, for the embodiment depicted, through the core air flowpath 37, and more specifically, through the aft strut 98. The electric line 116 is electrically coupled to the stator assembly 84 of the permanent magnet electric machine 80. The exemplary electric transfer bus 114 depicted generally includes power electronics 118 in communication with the electric line 116 that may be utilized to manipulate electrical power provided to the permanent magnet electric machine 80, or to extract electrical power from the permanent magnet electric machine 80, and more specifically, to or from the stator assembly 84 of the permanent magnet electric machine 80.

Additionally, electric transfer bus 114 includes one or more sensors operable with the electric line 116, the power electronics 118, or both. More specifically, for the embodiment shown, the electric transfer bus 114 includes a first sensor 120 operable with the electric line 116 (i.e., to sense data from the electric line 116) and a second sensor 122 operable with the power electronics 118 (i.e., to sense data from the power electronics 118). The first sensor 120, the second sensor 122, or both may be configured to sense various parameters of the electric transfer bus 114 and/or the power electronics 118 to determine one or more operability parameters of the permanent magnet electric machine 80. For example, the first sensor 120, the second sensor 122, or both may be utilized to determine an amount of electrical power being extracted from the permanent magnet electric machine 80, an amount of electrical power being provided to the permanent magnet electric machine 80, a voltage of such power, an amplitude of a current of such power, a frequency of such current, etc.

Briefly, a controller 124 is also provided in operable communication with the electric transfer bus 114. Notably, although the controller 124 is depicted as being positioned physically separate from the turbofan engine 10 and permanent magnet electric machine 80, in other embodiments, the controller 124 may be positioned, or otherwise integrated into, the turbofan engine 10, an aircraft incorporating the turbofan engine 10, the permanent magnet electric machine 80, etc.

The exemplary controller 124 generally includes a network interface 126. The network interface 126 may be operable with any suitable wired or wireless communications network for communicating data with other components of, e.g., the turbofan engine 10, the permanent magnet electric machine 80, the electric transfer bus 114, and/or other components or systems not depicted. As depicted using phantom lines in FIG. 2, for the embodiment depicted, the network interface 126 utilizes a wireless communication network to communicate data with other components, including the first sensor 120, the second sensor 122, and the power electronics 118. In such a manner, the controller 124 may control operation of the power electronics 118. It will be appreciated, of course, that although the network interface 126 utilizes the wireless communication network for the embodiment of FIG. 2, in other embodiments, the network interface 126 may instead utilize a wired communication network, or a combination of wired and wireless communication networks.

Referring still to FIG. 2, the exemplary controller 124 further includes one or more processors 128 and memory 130. The memory 130 stores data 132 accessible by the one or more processors 128. The one or more processor(s) 128 can include any suitable processing device, such as a microprocessor, microcontroller 124, integrated circuit, logic device, and/or other suitable processing device. The one or more memory device(s) 130 can include one or more computer-readable media, including, but not limited to, non-transitory computer-readable media, RAM, ROM, hard drives, flash drives, and/or other memory devices. The data 132 may include instructions that when executed by the one or more processors 128 cause the system 204 to perform functions. One or more exemplary aspects of these functions may be described below with respect to the exemplary method 200 of FIG. 6. The instructions within the data 132 can be any set of instructions that when executed by the one or more processor(s) 128, cause the one or more processor(s) 128 to perform operations. In certain exemplary embodiments, the instructions within the data 132 can be software written in any suitable programming language or can be implemented in hardware. Additionally, and/or alternatively, the instructions can be executed in logically and/or virtually separate threads on processor(s) 128. The memory device(s) 130 can further store other data 132 that can be accessed by the processor(s) 128.

It will be appreciated, however, that the exemplary electric transfer bus 114 (including the power electronics 118 and electric line 116), controller 124, and sensors 120, 122 are provided by way of example only. In other exemplary embodiments, one or more of these components may be configured in any other suitable manner, and/or any other suitable configuration may be provided for controlling operations related to the permanent magnetic electric machine 80.

Referring still to FIG. 2, it will be appreciated that the permanent magnet electric machine 80 may be configured to extract a relatively high amount of power from the turbofan engine 10. For example, the turbofan engine 10, or rather, the turbomachine 16 of the turbofan engine 10, may be configured to generate a maximum amount of power during operation. This maximum amount of power may be a rated power level of the turbomachine 16. Additionally, the permanent magnet electric machine 80 may be capable extracting a maximum amount of power from the turbofan engine 10, or rather, the turbomachine 16 of the turbofan engine 10, during operation. For example, the maximum amount of power the permanent magnet electric machine 80 is capable of extracting may be set based on design parameters of the permanent magnet electric machine 80 designed to allow the permanent magnet electric machine 80 to operate without significantly degrading. In at least certain exemplary embodiments, the maximum amount of power the permanent magnet electric machine 80 is capable extracting from the turbofan engine 10, or rather, the turbomachine 16, is between about 2.5 percent and about seventy-five percent (75%) of the maximum amount of power the turbofan engine 10, or rather, the turbomachine 16 of the turbofan engine 10, is configured to generate during operation. For example, in at least certain exemplary embodiments, the maximum amount of power the permanent magnet electric machine 80 is capable of extracting from the turbofan engine 10 is greater than about three percent (3%) of the maximum amount of power the turbofan engine 10 is configured to generate during operation, such as greater than about five percent (5%), such as greater than about ten percent (10%), such as greater than about twenty-five percent (25%).

By way of example only, the turbofan engine 10 may be rated to generate 40,000 horsepower, and the permanent magnet electric machine 80 may be capable of extracting approximately 1,500 kilowatts, or about 2,000 horsepower. Of course, in other embodiments, these numbers may vary greatly (e.g., the gas turbine engine may be significantly more or less powerful, and/or the permanent magnet electric machine 80 may be significantly more or less powerful). Regardless, such may allow for providing a desired amount of power to, e.g., an electric fan of a propulsion system including the turbofan engine 10 and permanent magnet electric machine 80, and/or to any other suitable power sink of an aircraft.

However, by utilizing such a relatively powerful permanent magnet electric machine 80, a failure of the permanent magnet electric machine 80 may create an undesirably high drag on the turbofan engine 10 and may generate undesirably high levels of heat. For example, the permanent magnet electric machine 80 may experience an internal coil fault (i.e., a stator winding short-circuit of the stator assembly 84) if, e.g., an insulation of the coils 86 breaks down. In such a scenario the permanent magnet electric machine 80 may extract power from the turbofan engine 10 without generating a corresponding amount of electrical power for the propulsion system. For example, depending on the severity of the internal coil fault of the permanent magnet electric machine 80, the permanent magnet electric machine 80 may not generate any electrical power, while still extracting a relatively high amount of power from the turbofan engine 10, such as up to the maximum amount of power the permanent magnet electric machine 80 is capable of extracting, noted above (therefore acting as a significant drag on the engine). Notably, the internal coil fault may, in certain exemplary embodiments, be determined by the controller 124 based on data sensed by the one or more sensors, i.e., the first sensor 120 and the second sensor 122 for the embodiment depicted. Additionally, it will be appreciated that the internal coil fault may generate a relatively high amount of heat (potentially leading to further damage). Accordingly, in certain embodiments, the internal coil fault may be determined by the controller 124 based on sensed data indicative of a temperature of the permanent magnet electric machine 80 or a component or system indicative of a temperature of the permanent magnet electric machine 80.

Further, given that the permanent magnets 88 are utilized with the rotor assembly 82, the permanent magnets 88 may not be "switched off," as with other types of electric machines. Accordingly, the system of the present disclosure is configured to reduce a magnetism of one or more permanent magnets 88 of the permanent magnet electric machine 80, or more specifically, to reduce a magnetism of the permanent magnets 88 of the rotor assembly 82 of the permanent magnet electric machine 80, in response to determining the fault condition of the permanent magnet electric machine 80 (e.g., the internal coil fault—although it may also be appropriate in the event of other fault conditions of the permanent magnetic electric machine 80). More specifically, for the embodiment shown, the system of the present disclosure is configured to reduce the magnetism of the permanent magnets 88 by increasing a temperature of the rotor assembly 82 of the permanent magnet electric machine 80, and more specifically, of the permanent magnets 88 of the rotor assembly 82.

Specifically, for the embodiment depicted, the system is configured to reduce the magnetism of the permanent magnets 88 utilizing electricity/induction. For example, for the embodiment depicted, the system is configured to increase the temperature the one or more permanent magnets 88 by driving current through the stator 106 of the stator assembly 84 of the permanent magnet electric machine 80 to induce eddy current losses. For example, the permanent magnet electric machine 80 may define a designed current frequency operating range. As used herein, the term "designed current frequency operating range" refers to a current frequency range for electric power that the permanent magnet electric machine 80 is configured to generate when extracting power from the turbofan engine 10, and/or is configured to receive during normal operations when adding power to the turbofan engine 10. With the present disclosure, the system may further be configured to increase the temperature of the one or permanent magnets 88 by driving current through stator 106 the stator assembly 84 at a frequency greater than the designed current frequency operating range. Such may further induce the eddy current losses, as noted above, which may in turn increase a temperature within the permanent magnet electric machine 80, and more notably within the rotor assembly 82.

Notably, it will be appreciated that the permanent magnets 88 of the rotor assembly 82 each generally define a Curie temperature. The Curie temperature refers to a temperature above which a magnetism of the permanent magnets 88 irreversibly is decreased or altogether lost. Accordingly, in certain embodiments, increasing the temperature of the permanent magnets 88 may include increasing the temperature of the permanent magnets above their respective Curie temperatures.

For example, in at least certain exemplary embodiments, in order to increase the temperature of the permanent magnets 88 of the permanent magnet electric machine 80, the system may add between about five (5) kilowatts and about five hundred (500) kilowatts of heat energy to the permanent magnet electric machine 80. More specifically, in at least some embodiments, the system may add at least about ten (10) kilowatts of heat energy, such as at least about twenty-five (25) kilowatts of heat energy.

It will be appreciated that by increasing the temperature in this manner, the system may irreversibly reduce or extinguish a magnetism of the permanent magnets 88 of the rotor assembly 82 of the permanent magnet electric machine 80. However, it may be desirable to permanently damage the permanent magnet electric machine 80 in order to reduce or extinguish the drag the permanent magnet electric machine 80 may have on the turbofan engine 10 during, e.g., a flight of an aircraft incorporating the turbofan engine 10 having the permanent magnet electric machine 80 experiencing, e.g., an internal coil fault. For example, using the numbers provided in the non-limiting example above, it may be more desirable to permanently damage the electric machine 80 to avoid an approximately 2,000 horsepower drag on a 40,000 horsepower engine for an extended period of time.

Further, it will be appreciated that the exemplary turbofan engine 10 and permanent magnet electric machine 80 described above with reference to FIGS. 1 and 2 is provided by way of example only. In other exemplary embodiments, the turbofan engine 10 and permanent magnet electric machine 80 may instead have any other suitable configuration. For example, in other embodiments, any other suitable means may be provided for increasing the temperature of the one or more permanent magnets 88 of the permanent magnet electric machine 80 to reduce the magnetism of such permanent magnets 88 in response to determining a fault condition of the permanent magnet electric machine 80.

Figure 3:
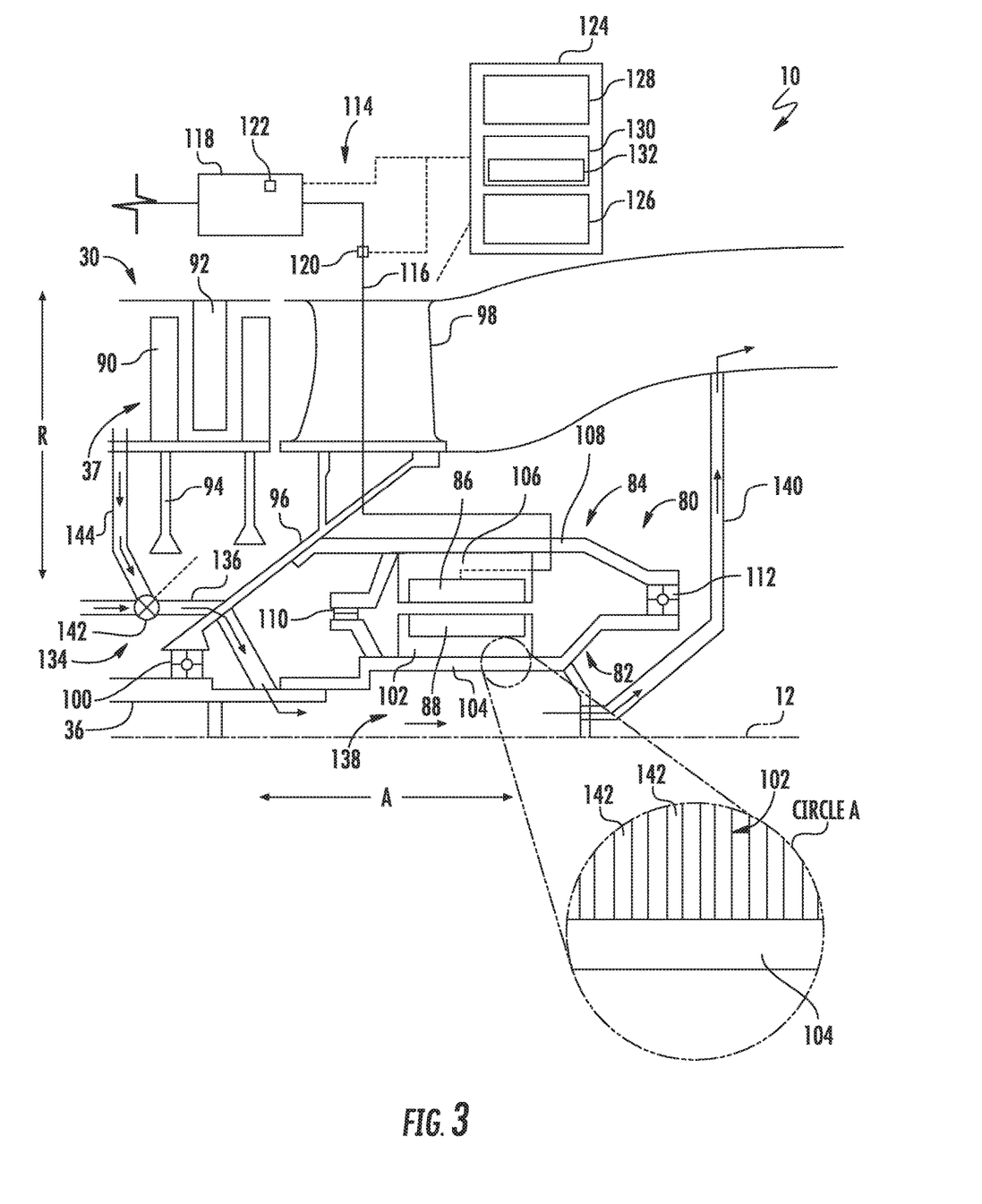
FIG. 3 is a schematic, close-up view of a gas turbine engine and permanent magnet electric machine in accordance with another exemplary embodiment of the present disclosure.
Figure 4:
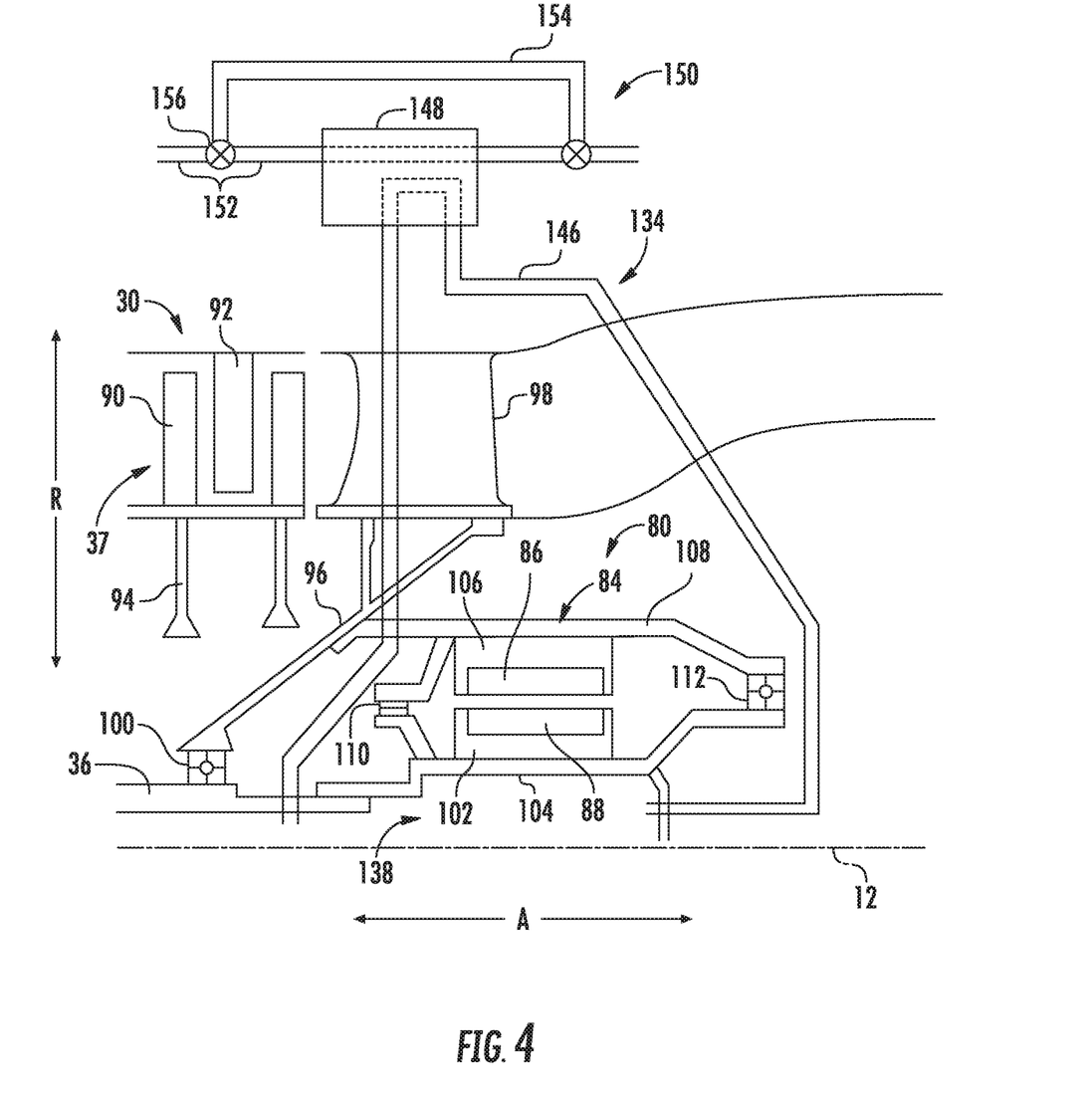
FIG. 4 is a schematic, close-up view of a gas turbine engine and permanent magnet electric machine in accordance with yet another exemplary embodiment of the present disclosure.
Figure 5:
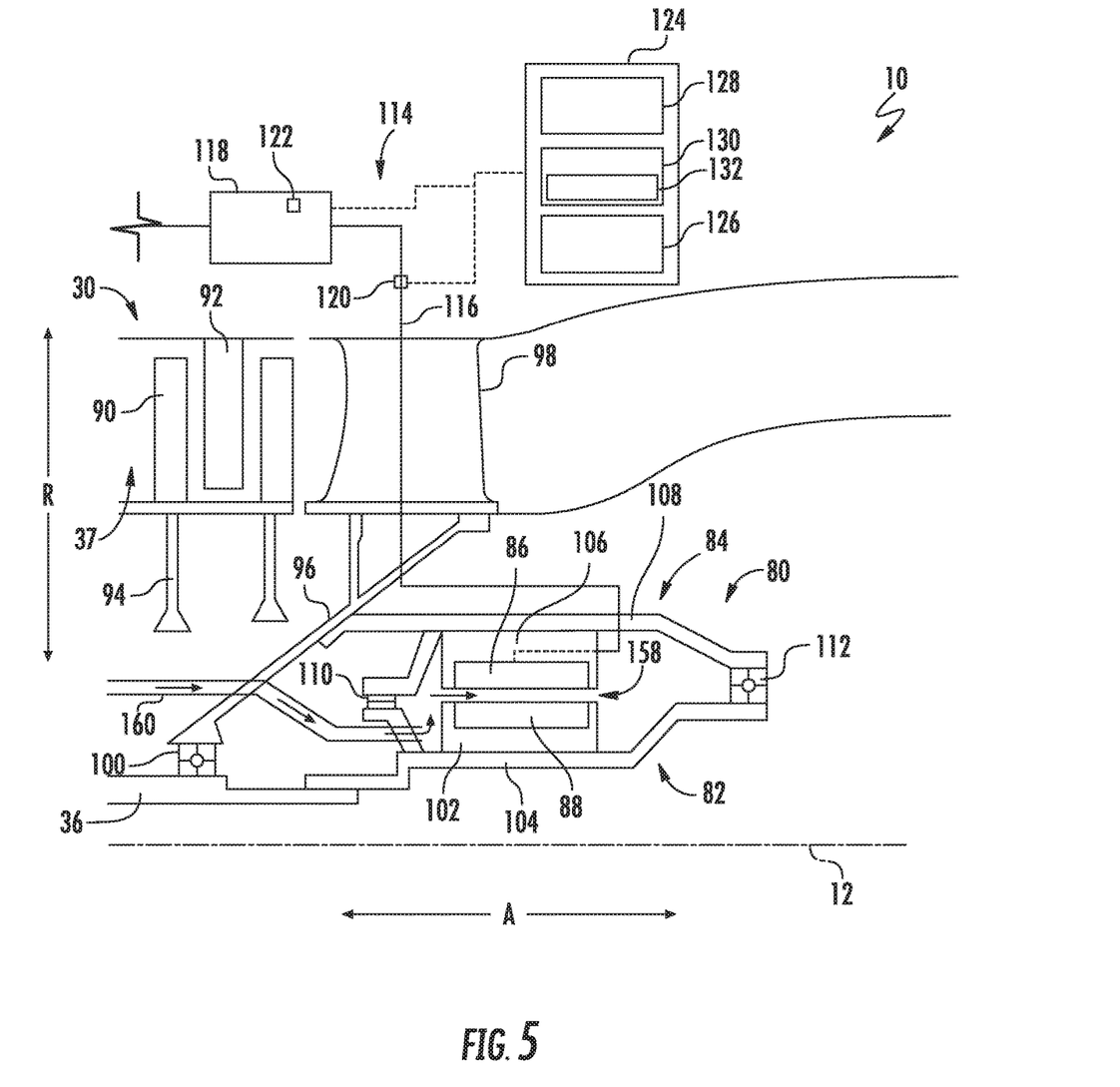
FIG. 5 is a schematic, close-up view of a gas turbine engine and permanent magnet electric machine in accordance with still another exemplary embodiment of the present disclosure.

For example, FIGS. 3 through 5 provide various alternative exemplary embodiments of the turbofan engine 10 and permanent magnet electric machine 80 described above with reference to FIGS. 1 and 2. Each of the embodiments of FIGS. 3 through 5 may generally be configured in substantially the same manner as the embodiment described above with reference to FIGS. 1 and 2. For example, each of the exemplary turbofan engines 10 depicted in FIGS. 3 through 5 generally include a permanent magnet electric machine 80 having a rotor assembly 82 coupled to a rotary component of the turbofan engine 10 (i.e., an LP shaft 36 for the embodiments shown) and a stator assembly 84 coupled to a stationary component of the turbofan engine 10 (i.e., a structural support member 96 for the embodiments shown). The stator assemblies 84 of the permanent magnet electric machines 80 each include a plurality of coils 86 and each is electrically coupled to a respective electric transfer bus 114 via an electric line 116. Additionally, the rotor assemblies 82 of the permanent magnet electric machines 80 each generally include a rotor 102 having a plurality of permanent magnets 88 and a rotor shaft 104.

Referring particularly to FIG. 3, the turbofan engine 10 further includes a thermal management system 134 for the permanent magnet electric machine 80. For the embodiment of FIG. 3, the thermal management system 134 utilizes a cooling airflow to maintain a temperature of the permanent magnet electric machine 80 within a desired operating temperature range during normal operations. For example, the thermal management system 134 generally includes an inlet conduit 136 which may receive a bleed airflow from, e.g., the compressor section of the turbofan engine 10. The thermal management system 134 may further include a heat exchanger (not shown) for reducing a temperature of such bleed airflow. As is depicted schematically, the shaft 104 of the rotor assembly 82 is configured as a hollow shaft 104, defining an opening 138 extending along a length thereof, i.e., along the axial direction A of the turbofan engine 10. The inlet conduit 136 of the thermal management system 134 is positioned in airflow communication with the opening 138 in the rotor shaft 104, such that the inlet conduit 136 may provide the cooling airflow to and through the opening 138 of the rotor shaft 104 to reduce a temperature of the rotor 102 and permanent magnets 88.

The thermal management system 134 also includes an exhaust conduit 140 in airflow communication with the rotor shaft 104. The exhaust conduit 140 extends to the core air flowpath 37 to exhaust the heated air to the core air flowpath 37. For the embodiment depicted, the inlet conduit 136 is in airflow communication with the opening 138 through the rotor shaft 104 at a location forward of the rotor 102 of the rotor assembly 82 and the exhaust conduit 140 is in airflow communication with the opening 138 of the rotor shaft 104 at a location downstream of the rotor 102 of the rotor assembly 82. However, in other embodiments, other configurations are contemplated.

Notably, for example, referring briefly to the callout Circle A in FIG. 3, the rotor 102 is formed of a plurality of laminations 142 tightly fitted to the rotor shaft 104. Torque of the permanent magnet electric machine 80 is transferred through this connection between the rotor shaft 104 and laminations 142 of the rotor 102. Additionally, given this relatively tight fit, heat may be transferred through conduction between the laminations 142 of the rotor 102 and the rotor shaft 104, and thus to the cooling fluid flowing through the opening 138 in the rotor shaft 104.

In order to increase the temperature of the permanent magnets 88 of the rotor assembly 82 of the exemplary embodiment of FIG. 3 (i.e., in response to the determination of a fault condition of the permanent magnet electric machine 80), the system may reduce a cooling of the permanent magnet electric machine 80 using the thermal management system 134 (i.e., reduce an operability of the thermal management system 134). For example, the system may shut off or reduce a flow of cooling airflow through the inlet conduit 136 to the opening 138 of the rotor shaft 104, allowing the permanent magnets 88 of the rotor assembly 82 to increase in temperature and lose magnetization. Additionally, or alternatively, the system may bypass a heat exchanger cooling the air provided through the inlet conduit 136.

More specifically, for the embodiment depicted, a valve 142 is provided within, or otherwise operable with, the inlet conduit 136 of the thermal management system 134. The valve 142 may also be operably connected to a controller 124 through a wireless communication network. The valve may shut off, or reduce the cooling airflow through the inlet conduit 136 to provide for such increase in temperature of the permanent magnets 88.

Additionally, or alternatively, the thermal management system 134 may be configured to provide a heating fluid to the permanent magnet electric machine 80 to increase the temperature of the permanent magnets 88. More specifically, for the embodiment depicted, the thermal management system 134 is selectively in airflow communication with a high-temperature fluid source through a high temperature fluid conduit 144, and more specifically, with a high temperature bleed airflow source through the high temperature fluid conduit 144. For the embodiment shown, the high temperature bleed airflow source is the turbine section of the turbofan engine 10. With such a configuration, the valve 142 of the thermal management system 134 may switch the airflow source from a relatively cool airflow source (providing the cooling airflow discussed above) to the high temperature bleed airflow source, such that the thermal management system 134 provides a heating fluid/heating airflow/high-temperature bleed airflow to the permanent magnet electric machine 80, and more specifically, to the opening 138 through the rotor shaft 104 of the rotor assembly 82. Such may further, and more quickly, increase a temperature of the permanent magnets 88 to demagnetize such permanent magnets 88. Notably, in other embodiments, the high temperature fluid source may be any other suitable high temperature fluid source (e.g., exhaust, compressor, etc.).

Referring now particularly to FIG. 4, the exemplary turbofan engine 10 again includes a thermal management system 134 for the permanent magnet electric machine 80. The thermal management system 134 is configured to provide a cooling fluid to an opening 138 through the rotor shaft 104 of the rotor assembly 82 of the permanent magnet electric machine 80. The thermal management system 134 depicted is configured as a closed loop system, circulating and reusing the cooling fluid through a thermal bus 146. For example, the cooling fluid may be a lubrication oil, such that the thermal management system 134 shares functionality with, e.g., a lubrication oil system for one or more sections of the turbofan engine 10.

The thermal management system 134 additionally includes a heat sink heat exchanger 148 in thermal communication with the cooling fluid flowing through the thermal bus 146. The heat sink heat exchanger 148 is additionally in thermal communication with a heat sink system 150. The heat sink system 150 may include any suitable source of relatively cool fluid, such as bypass airflow, compressor bleed airflow, fuel, etc. The heat sink heat exchanger 148 is therefore configured to transfer heat from the cooling fluid in the thermal bus 146 of the thermal management system 134 to the relatively cool fluid of the heat sink system 150. In such a manner, the thermal management system 134 may maintain a temperature of the permanent magnet electric machine 80 within a desired operating temperature range.

As is depicted, the heat sink system 150 includes a main line 152, a bypass line 154, and a bypass valve 156 (or rather a pair of bypass valves 156). In order to increase a temperature of the permanent magnets 88 of the rotor assembly 82 of the exemplary embodiment of FIG. 4 (i.e., in response to the determination of a fault condition of the permanent magnet electric machine 80), the system may again reduce a cooling of the permanent magnets 88 of the permanent magnet electric machine 80 using the thermal management system 134 (i.e., reduce an operability of the thermal management system 134). More specifically, the system may actuate the bypass valve 156 of the heat sink system 150 such that the relatively cool fluid through the main line 152 of the heat sink system 150 flows through the bypass line 154, bypassing the heat sink heat exchanger 148 of the thermal management system 134. In such a manner the cooling fluid flowing through the thermal bus 146 of the thermal management system 134 may be unable to reject heat from the permanent magnet electric machine 80. The cooling fluid, and thus the permanent magnet electric machine 80, may therefore continue to rise in temperature and a magnetism of the permanent magnets 88 may be reduced or eliminated.

Notably, although the bypass functionality is provided by the heat sink system 150 for the embodiment shown, in other embodiments, the bypass functionality may instead be built into the thermal bus 146 of the thermal management system 134. Additionally, in certain exemplary embodiments, instead of bypassing the heat sink heat exchanger, the system may reduce a flow of cooling fluid through the heat sink system 150, reduce a flow of cooling fluid through the thermal bus 146, or both.

Referring now particularly to FIG. 5, the exemplary permanent magnet electric machine 80, as stated, includes a stator assembly 84 having a stator 106 and a rotor assembly 82 having a rotor 102. Further, as will be appreciated from, e.g., FIG. 5, the stator 106 of the stator assembly 84 and rotor 102 of the rotor assembly 82 together define an airgap 158 therebetween, generally along a radial direction R of the exemplary turbofan engine 10. During operation of the permanent magnet electric machine 80, the rotor assembly 82 will be rotating relatively quickly relative to the stator assembly 84. Additionally, the airgap 158 defined between the stator 106 and the rotor 102 may be relatively small. Further, the system generally includes a fluid duct 160 in fluid communication with the airgap 158.

In order to increase the temperature of the permanent magnets 88 of the rotor assembly 82 of the exemplary embodiment of FIG. 5 (i.e., in response to the determination of a fault condition of the permanent magnet electric machine 80), the system may inject a fluid into the airgap 158 of the permanent magnet electric machine 80 using the fluid duct 160. The fluid injected into the airgap 158 may create an increased amount of friction, therefore increasing a temperature of the permanent magnets 88 of the rotor assembly 82 of the permanent magnet electric machine 80 and reducing or eliminating the magnetism of such permanent magnets 88.

Notably, in certain exemplary embodiments, the fluid injected may be air. However, in other embodiments, any other suitable fluid may be utilized. For example, in certain embodiments, the fluid may define a viscosity greater than a viscosity of air (such as at least 10% greater, 20% greater, 50% greater, or 100% greater, and up to, e.g., 5,000% greater), further increasing the amount of friction created and heat added to the permanent magnet electric machine 80.

It will be appreciated that in at least certain exemplary embodiments, features from the configurations depicted in FIGS. 2 through 5 may be combined to create still further embodiments. Additionally, in still other embodiments, the system for heating the permanent magnets 88 discussed with reference to one figure may be combined with the means for heating the permanent magnets 88 discussed with reference to a different figure. For example, the induction system described above with reference to FIG. 2 may be used in conjunction with the thermal management system 134 described above with reference to FIG. 4.

Further, it will be appreciated that the permanent magnetic electric machine 80 depicted is provided by way of example only. In other embodiments, the permanent magnetic electric machine 80 may be configured as an "outrunner" electric machine (with the rotor assembly arranged outward of the stator assembly), the permanent magnet electric machine 80 may be configured as an axial flow electric machine (with the rotor and stator being arranged along an axial direction and having an airgap with a substantially circular shape therebetween), etc.

Figure 6:
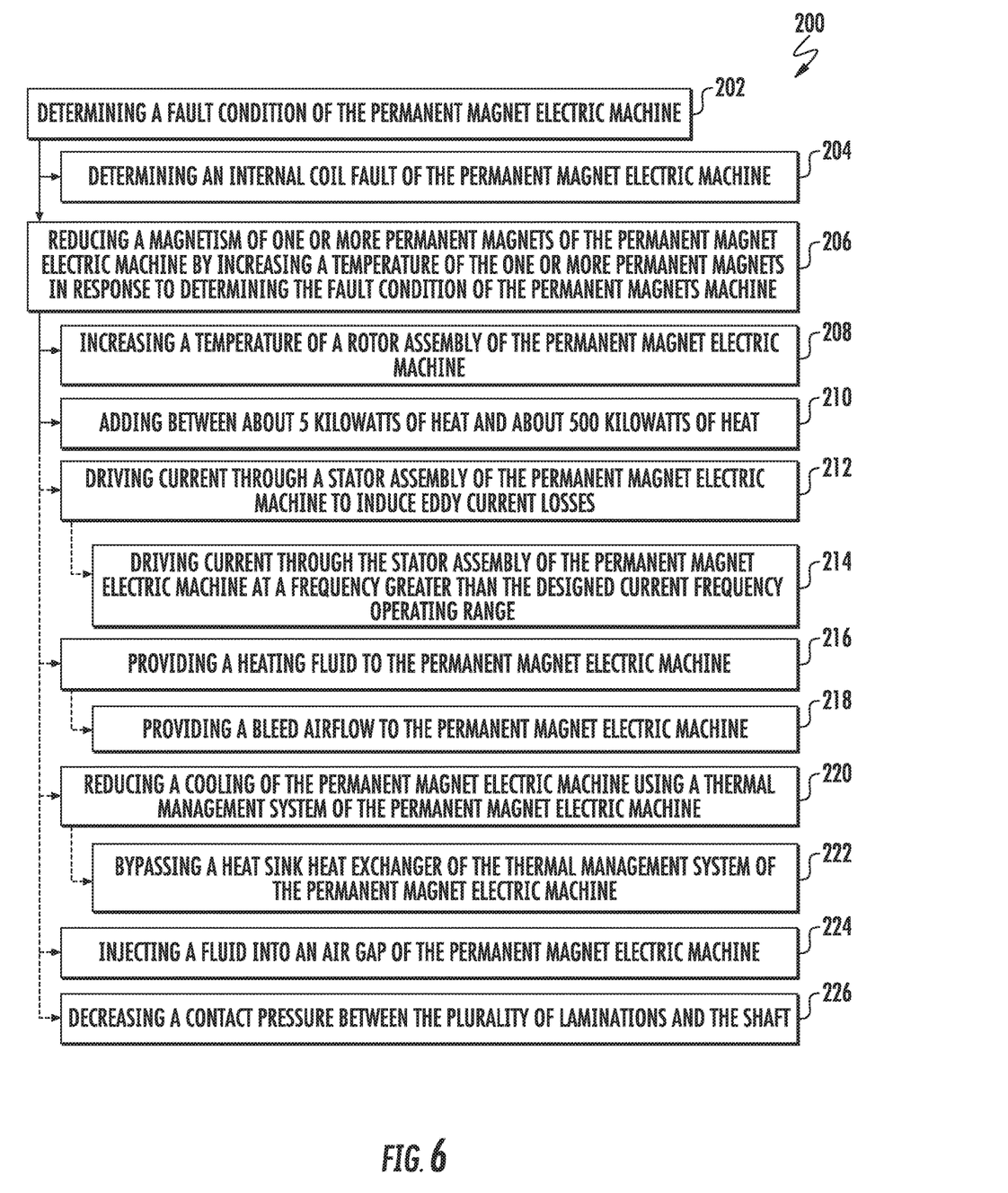
FIG. 6 is a flow diagram of a method for operating an engine in accordance with an exemplary aspect of the present disclosure.

Referring now to FIG. 6, a flow diagram of a method 200 for operating a permanent magnet electric machine of an engine in accordance with an exemplary aspect of the present disclosure is provided. In at least certain exemplary aspects, the permanent magnet electric machine and engine operated using the method 200 may be configured in accordance with one or more of the exemplary permanent magnet electric machines and engines described above with reference to FIGS. 1 through 5. Accordingly, it will be appreciated that in at least certain exemplary aspects, the engine may be a gas turbine engine, such as one of a turboshaft engine, turboprop engine, turbojet engine, or a turbofan engine.

For the exemplary aspect depicted in FIG. 6, the method 200 generally includes at (202) determining a fault condition of the permanent magnet electric machine. More specifically, for the exemplary aspect depicted, determining the fault condition of the permanent magnet electric machine at (202) includes at (204) determining an internal coil fault of the permanent magnet electric machine. The internal coil fault may refer to a stator winding short circuit fault, described in greater detail above. However, in other exemplary aspects, the fault condition may be any other suitable fault condition.

In at least certain exemplary aspects, determining the fault condition of the permanent magnet electric machine at (202) may include receiving data indicative of the fault condition through one or more sensors operably coupled to a stator assembly of the permanent magnet electric machine, to an electric line of an electric transfer bus (the electric line electrically coupled to the permanent magnet electric machine), to various power electronics of the electric transfer bus, etc. For example, in at least certain exemplary aspects, this data may be used in conjunction with various operating conditions of the engine to determine the fault condition, such as rotational speeds of the engine (e.g., of one or more shafts of the engine), temperatures within the engine (e.g., compressor inlet temperature, compressor exhaust temperature, turbine inlet temperature, turbine exhaust temperature, etc.), pressures within the engine, etc. For example, if the engine is operating in a manner consistent with a large drag on the engine, yet an amount of power being extracted by the permanent magnetic electric motor is less than an expected amount, the fault condition may be determined.

Referring still to FIG. 6, the method 200 further includes at (206) reducing a magnetism of one or more permanent magnets of the permanent magnet electric machine by increasing a temperature of the one or more permanent magnets in response to determining the fault condition of the permanent magnet electric machine at (202). More specifically, for the exemplary aspect depicted, reducing the magnetism of the one or more permanent magnets by increasing the temperature of the one or more permanent magnets at (206) includes at (208) increasing a temperature of a rotor assembly of the permanent magnet electric machine, the rotor assembly including the one or more permanent magnets. For example, the rotor assembly may include a rotor formed of a plurality of axially arranged laminations configured to mount a plurality of circumferentially arranged permanent magnets therein. The plurality of axially arranged laminations may be fitted to a rotor shaft, as discussed in greater detail above with reference to FIGS. 1 through 5.

It will be appreciated that for the exemplary aspect depicted, reducing the magnetism of the one or more permanent magnets by increasing the temperature of the one or more permanent magnets at (206) includes at (210) adding between about 5 kilowatts of heat and about 500 kilowatts of heat. The amount of heat added to increase the temperature of the one or more permanent magnets and decrease the magnetism of the one or more permanent magnets may be sufficient to increase the temperature of the one or more permanent magnets to a temperature approaching or exceeding a Curie temperature for such permanent magnets. In such a manner, the permanent magnets may irreversibly demagnetize or reduce in magnetization.

Further, for the exemplary aspect of the method 200 depicted in FIG. 6, a number of different ways are contemplated for reducing the magnetism of the one or more permanent magnets by increasing the temperature of the one or more permanent magnets at (206). For example, in the exemplary aspect of the method 200 depicted, reducing the magnetism of the one or more permanent magnets by increasing the temperature of the one or more permanent magnets at (206) may include at (212) driving current through a stator assembly of the permanent magnet electric machine to induce eddy current losses. More specifically, it will be appreciated that the permanent magnet electric machine defines a designed current frequency operating range and driving current through the stator assembly of the permanent magnet electric machine to induce eddy current losses at (212) may include driving current through the stator assembly of the permanent magnet electric machine at a frequency other than the designed current frequency operating range, and more specifically at (214) driving current through the stator assembly of the permanent magnet electric machine at a frequency greater than the designed current frequency operating range. The relatively high frequency electric current provided to the stator assembly will, as noted, induce eddy current losses within the permanent magnet electric machine, increasing a temperature of the permanent magnet electric machine.

Additionally, or alternatively, reducing the magnetism of the one or more permanent magnets by increasing the temperature of the one or more permanent magnets at (206) may include at (216) providing a heating fluid to the permanent magnet electric machine. For example, in at least certain exemplary aspects, providing the heating fluid to the permanent magnet electric machine at (216) may include at (218) providing a bleed airflow to the permanent magnet electric machine. The bleed airflow may be relatively high temperature airflow bled off of, e.g., a compressor within a compressor section of the engine, a turbine within a turbine section of the engine, or an exhaust of the engine. The heating fluid provided to the permanent magnet electric machine at (216) may be provided using a thermal management system, and may be provided to an area surrounding the rotor assembly of the permanent magnet electric machine, an opening through a rotor shaft of the rotor assembly of the permanent magnet electric machine, or any other suitable location capable of increasing a temperature of the one or more permanent magnets.

Additionally, or alternatively still, reducing the magnetism of the one or more permanent magnets by increasing the temperature of the one or more permanent magnets at (206) may include at (220) reducing a cooling of the permanent magnet electric machine using a thermal management system of the permanent magnet electric machine (i.e., reducing an operability of the thermal management system). For example, in certain exemplary aspects, reducing the cooling of the permanent magnet electric machine at (220) may include at (222) bypassing a heat sink heat exchanger of the thermal management system of the permanent magnet electric machine. Additionally, or alternatively, however, reducing the cooling of the permanent magnet electric machine using the thermal management system at (220) may include, e.g., slowing down or stopping a cooling flow through the thermal management system (e.g., for an open-loop, or closed loop thermal management system), slowing down or stopping a cooling flow to the permanent magnet electric machine from thermal management system (e.g., for an open-loop thermal management system), etc.

By reducing the cooling of the permanent magnet electric machine using the thermal management system at (220), heat generated through the operation of the permanent magnet electric machine may stay with the permanent magnet electric machine, thereby increasing a temperature of the one or more permanent magnets and reducing a magnetism of such one or more permanent magnets.

Additionally, or alternatively still, reducing the magnetism of the one or more permanent magnets by increasing the temperature of the one or more permanent magnets at (206) may include at (224) injecting a fluid into an air gap of the permanent magnet electric machine. In certain exempt aspects, the fluid may be air. However, in other exemplary aspects, the fluid may define a viscosity greater than a viscosity of air. Regardless, it will be appreciated that the airgap of the permanent magnet electric machine, defined between a rotor of the rotor assembly and a stator the stator assembly, may be relatively small, such that introducing a fluid therein at (224) may increase an amount of friction created during operation of the permanent magnet electric machine, thereby increasing an amount of heat generated and a temperature of the one or more permanent magnets, and therefore decreasing a magnetism of the one or more permanent magnets. Notably, although not depicted, the method 200 may further include evacuating all, substantially all, or at least a portion of the fluid from the airgap once the permanent magnets have been demagnetized to a desired degree (which may be determined in any suitable manner, such as by sensing a drag on the engine, a temperature of the permanent magnets and/or duration of increased temperature of the permanent magnets, etc.). Such may reduce an amount of viscous drag generated by the electric machine on the engine.

As is discussed above with reference to certain of the above embodiments, the rotor assembly of the permanent magnet electric machine may include a rotor formed of a plurality of laminations and a shaft. The plurality of laminations may be fitted onto the shaft, such that the heat may be exchanged between the plurality of laminations and the shaft through conduction. Therefore, a cooling flow (e.g., airflow, coolant flow, etc.) through an opening of the shaft of the rotor assembly may accept heat transferred from the laminations to the shaft. For the exemplary aspect of the method 200 depicted in FIG. 6, reducing the magnetism of the one or more permanent magnets by increasing the temperature of the one or more permanent magnets at (206) may include at (226) decreasing a contact pressure between the plurality of laminations and the shaft. By decreasing the contact pressure between the plurality of laminations and the shaft at (226), a heat rejection path from the permanent magnets/rotor assembly to a coolant flow may be disrupted. More specifically, by decreasing the contact pressure between the plurality of laminations and the shaft at (226), a conductive heat transfer between the laminations and the shaft may be frustrated, such that a temperature of the laminations and the one or more permanent magnets mounted thereto increases as desired. In at least certain exemplary aspects, decreasing the contact pressure between the plurality of laminations and the shaft at (226) may be accomplished by forming the laminations and the shaft of specific materials having desired coefficients of thermal expansion. For example, the laminations may be designed to expand more than the shaft at certain temperatures, such that once the shaft and laminations reach such temperatures, which may be indicative of a fault condition of the permanent magnet electric machine, the contact pressure between the plurality of laminations in the shaft decreases (potentially even forming a gap therebetween), thereby further increasing a temperature of the laminations and the plurality of permanent magnets as desired.

It will be appreciated, however, that in other exemplary aspects, any other suitable method may be utilized. For example, in other exemplary aspect, any other suitable method may be provided for increasing a temperature of the one or more permanent magnets of the permanent magnet electric machine in response to the determination of a fault condition of the permanent magnet electric machine and/or a combination of the above methods may be used.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a permanent magnet electric machine of an engine, the method comprising:
    determining a fault condition of the permanent magnet electric machine; and
    reducing a magnetism of one or more permanent magnets of the permanent magnet electric machine by increasing a temperature of the one or more permanent magnets in response to determining the fault condition of the permanent magnet electric machine, wherein reducing the magnetism of the one or more permanent magnets comprises providing a heating fluid to the one or more permanent magnets to increase the temperature of the one or more permanent magnets to irreversibly reduce or extinguish a magnetism of the one or more permanent magnets.

2. The method of claim 1, wherein the engine is a combustion engine.

3. The method of claim 1, wherein the engine is at least one of a turboshaft engine, a turboprop engine, or a turbofan engine.

4. The method of claim 1, wherein the engine is configured to generate a maximum amount of power during operation, wherein the permanent magnet electric machine is capable of extracting a maximum amount of power from the engine, and wherein the maximum amount of power the permanent magnet electric machine is capable of extracting from the engine is between about 2.5% and about 75% of the maximum amount of power the engine is configured to generate during operation.

5. The method of claim 4, wherein the maximum amount of power the permanent magnet electric machine is capable of extracting from the engine is greater than about 25% of the maximum amount of power the engine is configured to generate during operation.

6. The method of claim 1, wherein determining the fault condition of the permanent magnet electric machine comprises determining an internal coil fault of the permanent magnet electric machine.

7. The method of claim 1, wherein reducing the magnetism of the one or more permanent magnets by increasing the temperature of the one or more permanent magnets further comprises driving current through a stator assembly of the permanent magnet electric machine to induce eddy current losses in a rotor assembly of the permanent magnet electric machine.

8. The method of claim 7, wherein the permanent magnet electric machine defines a designed current frequency operating range, and wherein driving current through the stator assembly of the permanent magnet electric machine to induce eddy current losses comprises driving current through the stator assembly of the permanent magnet electric machine at a frequency other than the designed current frequency operating range.

9. The method of claim 1, wherein providing the heating fluid to the permanent magnet electric machine comprises providing a bleed air to the permanent magnet electric machine.

10. The method of claim 1, wherein reducing the magnetism of the one or more permanent magnets by increasing the temperature of the one or more permanent magnets further comprises reducing a cooling of the permanent magnet electric machine using a thermal management system.

11. The method of claim 10, wherein reducing the cooling of the permanent magnet electric machine using the thermal management system comprises bypassing a heat sink heat exchanger of the thermal management system.

12. The method of claim 1, wherein reducing the magnetism of the one or more permanent magnets by increasing the temperature of the one or more permanent magnets further comprises injecting a fluid into an air gap of the permanent magnet electric machine.

13. The method of claim 12, wherein the fluid defines a viscosity greater than a viscosity of air.

14. The method of claim 1, wherein reducing the magnetism of the one or more permanent magnets by increasing the temperature of the one or more permanent magnets further comprises adding between about five kilowatts of heat energy and about five hundred kilowatts of heat energy.

15. The method of claim 1, wherein the permanent magnet electric machine comprises a rotor assembly having a plurality of laminations and a shaft, wherein the plurality of laminations are fitted onto the shaft, and wherein reducing the magnetism of the one or more permanent magnets by increasing the temperature of the one or more permanent magnets further comprises decreasing a contact pressure between the plurality of laminations and the shaft.

16. The method of claim 15, wherein the engine comprises a thermal management system for providing a cooling fluid through one or more openings in the shaft.

17. An engine defining an axis and comprising:
    a stationary component;
    a rotary component rotatable about the axis of the engine relative to the stationary component;
    a permanent magnet electric machine comprising a stator assembly coupled to the stationary component and a rotor assembly coupled to the rotary component, the rotor assembly comprising one or more permanent magnets;
    a controller operable with the permanent magnet electric machine, the controller configured to determine a fault condition of the permanent magnet electric machine and increase a temperature of the one or more permanent magnets of the permanent magnet electric machine in response to determining the fault condition, wherein reducing the magnetism of the one or more permanent magnets comprises providing a heating fluid to the one or more permanent magnets to increase the temperature of the one or more permanent magnets to irreversibly reduce or extinguish a magnetism of the one or more permanent magnets.

18. The engine of claim 17, further comprising:
an electric transfer bus in electrical communication with the permanent magnet electric machine, wherein the controller is further operably connected to the electric transfer bus.

19. The engine of claim 18, wherein the engine is configured to generate a maximum amount of power during operation, wherein the permanent magnet electric machine is capable of extracting a maximum amount of power from the engine, and wherein the maximum amount of power the permanent magnet electric machine is capable of extracting from the engine is between about 2.5% and about 75% of the maximum amount of power the engine is configured to generate during operation.

20. A method for operating a permanent magnet electric machine of an engine, the method comprising:
determining a fault condition of the permanent magnet electric machine; and
reducing a magnetism of one or more permanent magnets of the permanent magnet electric machine by increasing a temperature of the one or more permanent magnets in response to determining the fault condition of the permanent magnet electric machine;
wherein reducing the magnetism of the one or more permanent magnets by increasing the temperature of the one or more permanent magnets comprises injecting a fluid into an air gap of the permanent magnet electric machine, reducing a cooling of the permanent magnet electric machine using a thermal management system, or both.

* * * * *